(12) United States Patent
Serrao et al.

(10) Patent No.: US 11,587,181 B1
(45) Date of Patent: Feb. 21, 2023

(54) PROPERTY DAMAGE ASSESSMENT SYSTEM

(71) Applicant: UIPCO, LLC, San Antonio, TX (US)

(72) Inventors: Nolan Serrao, Plano, TX (US); Minya Liang, Redmond, WA (US); Ruthie D. Lyle, Durham, NC (US); Ravi Durairaj, San Antonio, TX (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 257 days.

(21) Appl. No.: 16/941,164

(22) Filed: Jul. 28, 2020

Related U.S. Application Data (60) Provisional application No. 62/881,185, filed on Jul. 31, 2019.

(51) Int. Cl.
| | |
|---|---|
| *G06Q 40/00* | (2012.01) |
| *G06Q 40/08* | (2012.01) |
| *B64C 39/02* | (2023.01) |
| *G06T 7/00* | (2017.01) |

(52) U.S. Cl.
CPC ........... *G06Q 40/08* (2013.01); *B64C 39/024* (2013.01); *G06T 7/0002* (2013.01); *B64C 2201/123* (2013.01); *G06T 2207/10032* (2013.01)

(58) Field of Classification Search
USPC ................................. 705/4, 5, 39, 38, 37, 64
See application file for complete search history.

(56) References Cited

U.S. PATENT DOCUMENTS

| | | | | |
|---|---|---|---|---|
| 9,965,965 | B1* | 5/2018 | Loveland | G01C 11/02 |
| 10,102,449 | B1* | 10/2018 | Cosic | G06N 5/045 |
| 10,163,164 | B1* | 12/2018 | Tofte | G01C 11/02 |
| 10,572,944 | B1* | 2/2020 | Brandmaier | G06Q 40/08 |
| 10,692,160 | B1* | 6/2020 | Lyons | G06V 20/17 |
| 10,733,443 | B2* | 8/2020 | Loveland | G06V 20/17 |
| 10,977,734 | B1* | 4/2021 | Kenney | G06Q 40/08 |
| 11,055,797 | B1* | 7/2021 | Carone | H04L 67/12 |
| 11,062,166 | B2* | 7/2021 | Porter | G06V 10/82 |

(Continued)

FOREIGN PATENT DOCUMENTS

WO WO-2017173502 A1 * 10/2017

OTHER PUBLICATIONS

Research on the Adjustment of Engineering Insurance Rate Based on AHP under the Condition of Unit Price Contract; 2010 International Conference on Management and Service Science (pp. 1-4); Weike Chen, Baolan Yang, Zhenshi Zhang; Aug. 24, 2010. (Year: 2010).*

(Continued)

*Primary Examiner* — Tien C Nguyen
(74) *Attorney, Agent, or Firm* — Plumsea Law Group, LLC (57) ABSTRACT

A property damage assessment system may include a drone. The drone may include imaging equipment and a controller. The controller may include a device processor and a non-transitory computer readable medium including instructions executable by the device processor to perform the following steps: receiving imagery data of property from the imaging equipment of the drone; and automatically controlling the drone to obtain additional imagery data of the property based on the received imagery data.

16 Claims, 7 Drawing Sheets

(56) References Cited

U.S. PATENT DOCUMENTS

| | | | |
|---|---|---|---|
| 11,257,166 B2* | 2/2022 | Coonrod | G06N 20/00 |
| 11,325,705 B2* | 5/2022 | Diniz | B64C 39/024 |
| 11,367,053 B2* | 6/2022 | Watson | G06F 9/5005 |
| 2017/0205827 A1* | 7/2017 | Rezvani | G08B 25/008 |
| 2017/0270612 A1* | 9/2017 | Howe | G06Q 30/0278 |
| 2017/0270650 A1* | 9/2017 | Howe | G06V 10/764 |
| 2018/0211115 A1* | 7/2018 | Klein | G08B 13/24 |
| 2021/0192629 A1* | 6/2021 | Tofte | H04N 5/44 |

OTHER PUBLICATIONS

Image Processing for Drones Detection; 2019 5th International Conference on Engineering, Applied Sciences and Technology (ICEAST) (pp. 1-4); Rangpum Hamatapa, Charoen Vongchumyen; Jul. 2, 2019. (Year: 2019).*

* cited by examiner

PROPERTY DAMAGE ASSESSMENT SYSTEM

CROSS-REFERENCE TO RELATED APPLICATIONS

This application claims priority to Serrao et al., U.S. Provisional Application No. 62/881,185, filed Jul. 31, 2019, the entire disclosure of which is incorporated herein by reference.

TECHNICAL FIELD

The present disclosure generally relates to property damage assessment systems and, more particularly, to property damage assess systems configured to determine property conditions for purposes of insurance adjustment.

BACKGROUND

Following disasters, such as hurricanes, tornados, floods, etc., it can be difficult to assess property damage, particularly if data connections are unavailable or otherwise unreliable. Accordingly, those in need of insurance payment for damage to their homes or vehicles may be required to wait an undue amount of time before receiving the payment needed for repairing or replacing their property.

There is a need in the art for a system and method that addresses the shortcomings discussed above. In particular, there is a need in the art for a property damage assessment system.

SUMMARY

The present disclosure is directed to systems and methods for assessing property damage. In some embodiments, the disclosed system may include one or more drones configured to obtain imagery of potentially damaged property. In some cases, the users may use the camera on their personal electronic device to obtain the imagery. In either case, the imagery data may be processed locally in order to assess property damage.

In one aspect, the present disclosure is directed to a property damage assessment system. The system may include a drone. The drone may include imaging equipment and a controller. The controller may include a device processor and a non-transitory computer readable medium including instructions executable by the device processor to perform the following steps: receiving imagery data of property from the imaging equipment of the drone; and automatically controlling the drone to obtain additional imagery data of the property based on the received imagery data.

In another aspect, the present disclosure is directed to a property damage assessment system. The system may include a drone. The drone may include imaging equipment and a controller. The controller may include a device processor; and a non-transitory computer readable medium including instructions executable by the device processor to perform the following steps: receiving imagery data of property from the imaging equipment of the drone; and sending instructions to a remote device providing guidance for an operator of the drone to relocate in order to maintain line of sight with the drone.

In another aspect, the present disclosure is directed to a method of assessing property damage. The method may include using imaging equipment of a drone to obtain imagery data. The method may also include using a device processor on board the drone to execute instructions stored on a non-transitory computer readable medium to perform the following steps: receiving imagery data of property from the imaging equipment of the drone; and automatically controlling the drone to obtain additional imagery data of the property based on the received imagery data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The present disclosure is directed to systems and methods for assessing property damage. In some embodiments, the disclosed system may include one or more drones configured to obtain imagery of potentially damaged property. In some cases, the users may use the camera on their personal electronic device to obtain the imagery.

Further, the system may be configured to locally process the obtained imagery and assess the extent and cost value of damage evident in the imagery. Further, the system may be configured to initiate an insurance payment to a member for repair or replacement of the damaged property.

In some embodiments, the processing may be performed on the drone itself. In some embodiments, the disclosed system may include an app to enable users to upload the imagery and perform the assessment processing on their personal electronic device. Further, in some embodiments, the imagery may be uploaded to a processing center managed by the insurance company. In some cases, the user may interact with the processing center via a web-based interface.

Figure 1:
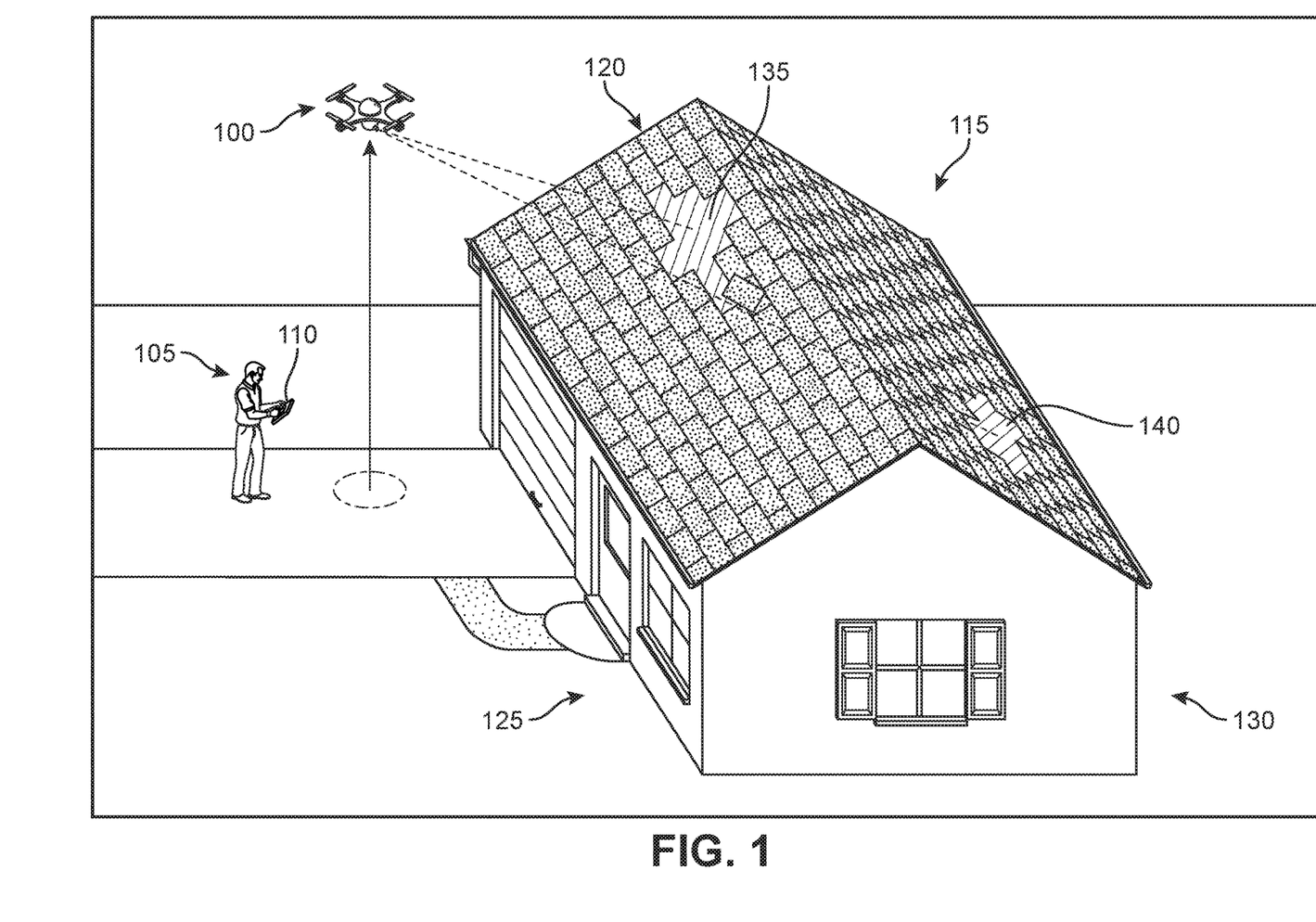
FIG. 1 is a schematic illustration of a drone collecting imagery of roof damage to a house.

FIG. 1 is a schematic illustration of a drone collecting imagery of roof damage to a house. As shown in FIG. 1, in some embodiments, a property damage assessment system may include at least one drone 100 utilized to collect imagery to document property damage. As shown in FIG. 1, drone 100 may be an aerial drone. However, in some embodiments, land vehicle drones and/or watercraft drones may be used similarly as discussed herein with respect to aerial drones.

The specifications of the drones associated with the system may be suited for the type of terrain, routes, and photographs for which the drones are to be used. For example, the drones may have enough power to carry the necessary photography equipment. In addition, the drones may have enough range, both in terms of controllability/navigation and battery life in order to travel the required distance to the location to be photographed. For example, drones may be configured with capability to fly from an edge of a disaster area to locations that are centrally located within the disaster area. In some cases, the drones may be capable of flying from an edge of a disaster area to an opposite edge of the disaster area. For example, if a disaster area falls along a coastline or lake, the shoreline may form the edge of the disaster area on one side. Accordingly, the closest a drone may be deployed to the location to be photographed may be the opposite edge of the disaster area. Accordingly, the drones may be capable of traversing the full distance across the disaster area to complete certain reconnaissance missions. The system may be configured to dispatch the drones according to the specifications of each drone.

Further, the communication capabilities shall also be duly suited for each drone's intended use. In some embodiments, the drones may be autonomous. That is, the drones may be programmable to execute imaging runs to designated locations. In other embodiments, the drones may be piloted remotely. In some embodiments, the drones may operate pseudo-automatically, with minimal control and guidance from an operator.

Drone 100 may configured with any suitable imagery equipment. For example, such equipment may include a still image camera, a video camera, infrared imaging equipment, night vision imaging equipment, etc. Any suitable system may be utilized for video and/or audio communication. For example, radio, satellite, cellular, Internet, or other communication networks may be utilized. In some cases, the system may be configured for the drones to send the images back to a control center without having to physically return to the center for download of the images.

In some embodiments, the system may include a controller. In some embodiments, the controller may be disposed on board drone 100. In other embodiments, the controller may be disposed in a separate location, such as a personal electronic device of a user, or in a processing center.

The controller may include various computing and communications hardware, such as servers, integrated circuits, displays, etc. Further, the controller may include a device processor and a non-transitory computer readable medium including instructions executable by the device processor to perform the processes discussed herein.

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The controller may include networking hardware configured to interface with other nodes of a network, such as a LAN, WLAN, or other networks. In Further, the controller may be configured to receive data from a plurality of sources and communicate information to one or more external destinations. Accordingly, the controller may include a receiver and a transmitter. (It will be appreciated that, in some embodiments, the receiver and transmitter may be combined in a transceiver.)

Any suitable communication platforms and/or protocols may be utilized for communication between the controller and other components of the system. Since the various sources of information may each have their own platform and/or protocol, the system may be configured to interface with each platform and/or protocol to receive the data.

The non-transitory computer readable medium of the system may include instructions executable by the device processor to receive imagery data of property from the imaging equipment of drone 100. As shown in FIG. 1, the flight of drone 100 may be controlled, or otherwise observed by an operator 105, who may utilize a remote device 110. In some cases, remote device 110 may be a self-contained device. In other embodiments, remote device 110 may utilize a personal electronic device, such as a smart phone, to serve as the interface. In some embodiments, the entire remote device 110 may consist of a personal electronic device, such as a smart phone.

As shown in FIG. 1, drone 100 is illustrated collecting imagery of property, in this case a house 115. In FIG. 1, drone 100 is hovering over a front yard proximate a front side 125 of house 115. As also shown in FIG. 1, drone 100 is pictured flying high enough to observe damage to a roof 120 of house 115 on both a front portion and a rear portion of roof 120. In particular, a drone 100 is shown collecting imagery of a first damaged portion 135 on a front portion of roof 120 and a second damaged portion 140 on a rear portion of roof 120 proximate a rear side 130 of house 115.

In addition, the computer readable medium may include instructions for automatically controlling the drone to obtain additional imagery data of the property based on the received imagery data. For example, if an anomaly is observed in the collected imagery that may indicate that damage exists, the drone may automatically fly into position to obtain additional imagery that better captures the damaged portion of the property.

Figure 2:
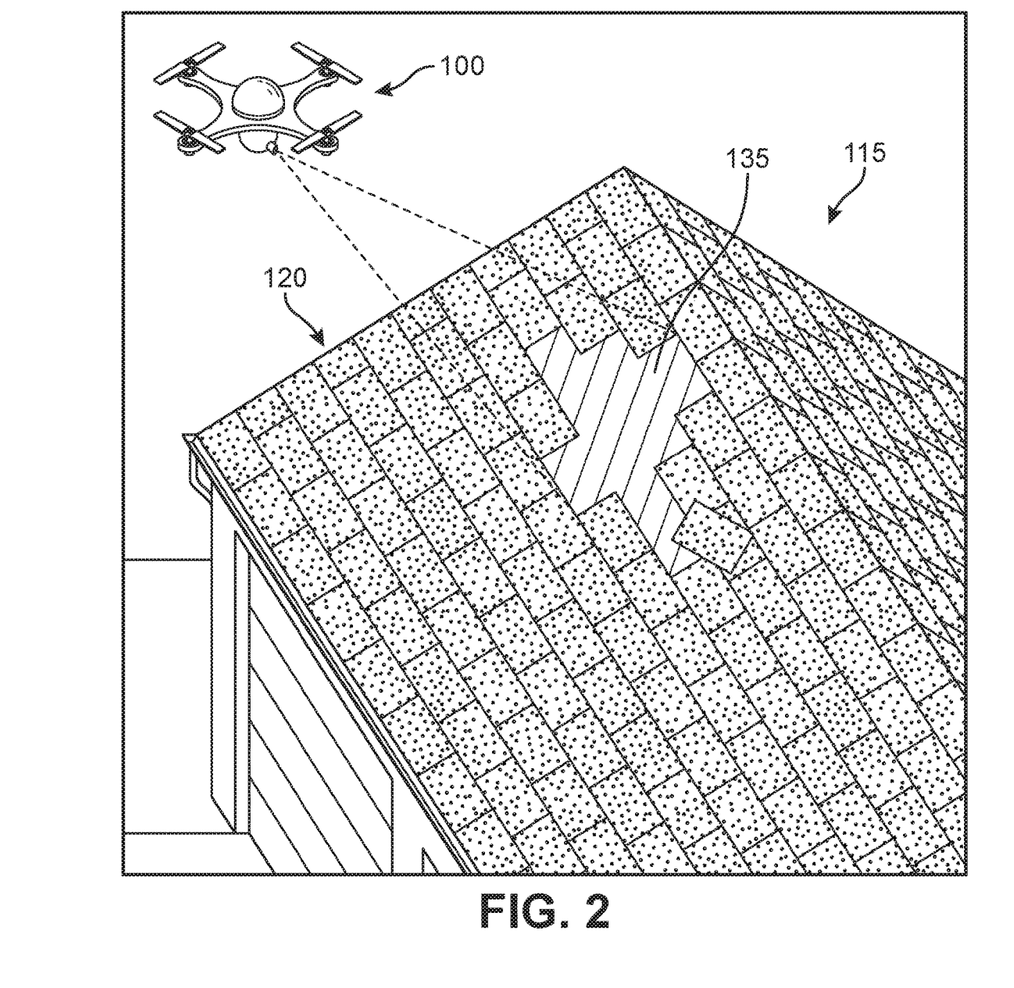
FIG. 2 is a schematic illustration of the drone of FIG. 1 collecting additional imagery of a damaged portion to the house.

FIG. 2 is a schematic illustration of the drone of FIG. 1 collecting additional imagery of a damaged portion to the house. As shown in FIG. 2, drone 100 has been flown closer to, and at a better angle with respect to, first damaged portion 135 of roof 120. This permits the imaging equipment of drone 100 to collect more detailed imagery of damaged portion 135, which facilitates assessment of the damage and its value.

In some embodiments, the drone may automatically position itself to collect additional imagery. In some cases, the drone may need to move around to a different side of the house in order to do so. Accordingly, the drone may need to relocate to a location that is not within line of sight to the operator's current position. In order to ensure that the operator remains within line of sight, the system may provide the user with messaging that instructs the user to move to maintain line of sight with the drone. For example, the system's computer readable medium may further include instructions for sending instructions to the user's remote control device to display a message for an operator of the drone. In some embodiments, the messaging for the operator may include instructions to relocate themselves, for example, in order to maintain line of sight with the drone.

Figure 3:
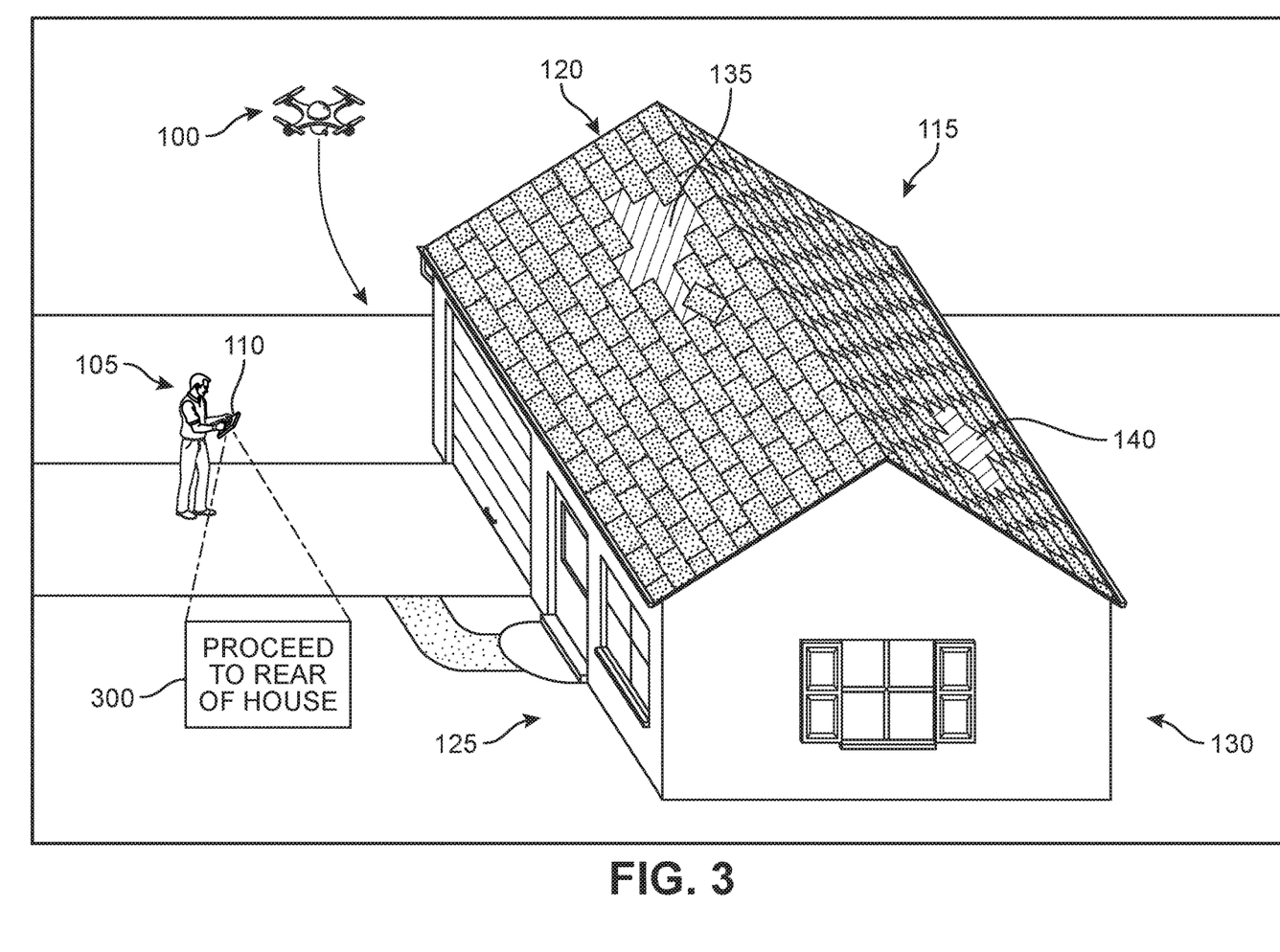
FIG. 3 is a schematic illustration of the drone proceeding to a different location and the drone controller instructing the operator to follow.

FIG. 3 is a schematic illustration of the drone proceeding to a different location and the drone controller instructing the operator to follow. In particular, in order to collect additional imagery of second damaged portion 140 on the rear of roof 120, the drone must fly around to the rear of the house. Accordingly, as shown in FIG. 3, drone 100 is shown flying across the front yard of house 115, and remote device 110 is displaying a message 300 "PROCEED TO REAR OF HOUSE" to operator 105.

Figure 4:
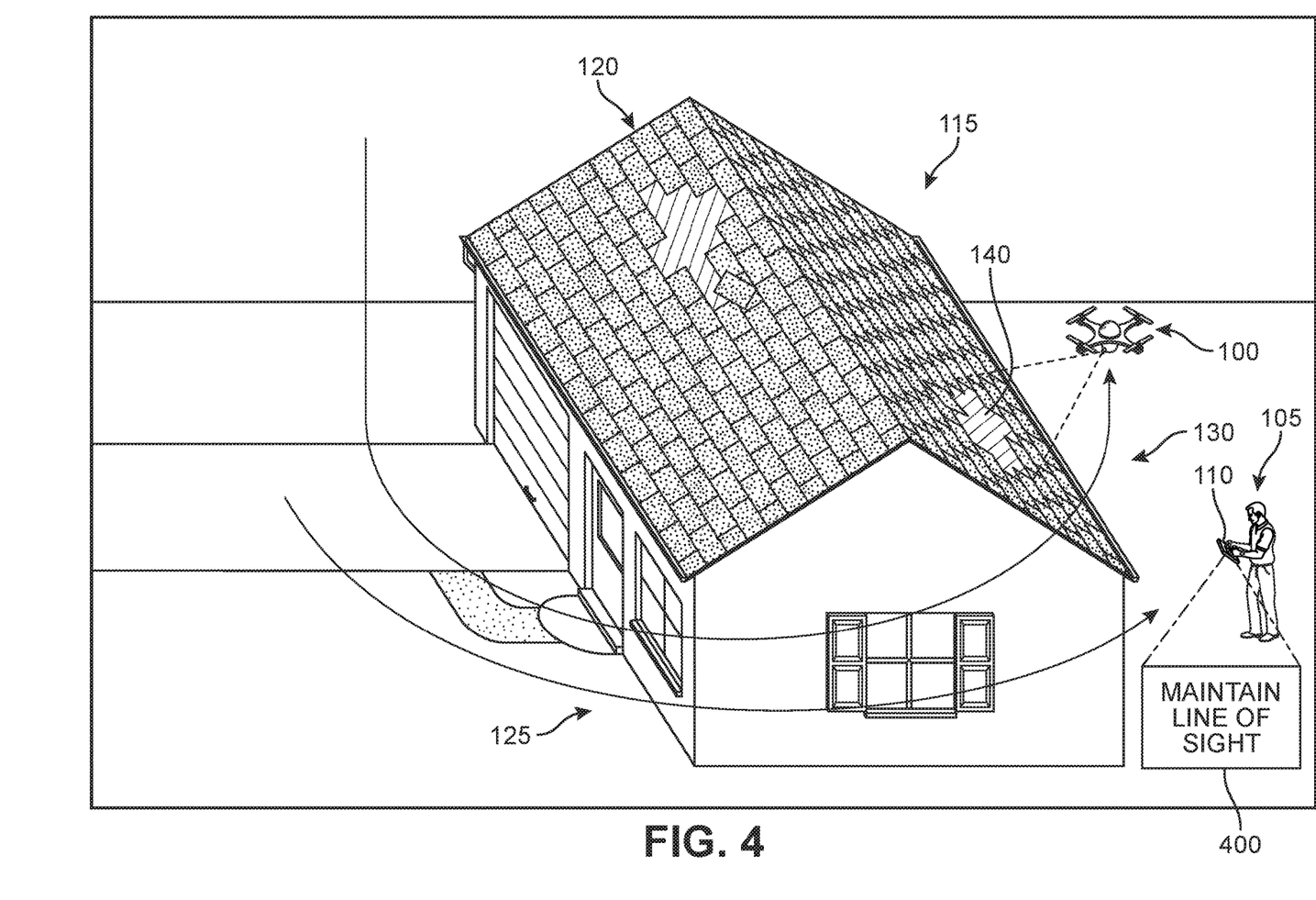
FIG. 4 is a schematic illustration of the drone proceeding to the rear of the house to collect additional imagery of a different damaged portion of the roof, and the operator moving to the rear of the home as well in order to maintain line of sight with the drone.

FIG. 4 is a schematic illustration of the drone proceeding to the rear of the house to collect additional imagery of a different damaged portion of the roof, and the operator moving to the rear of the home as well in order to maintain line of sight with the drone. In particular, as shown in FIG. 4, drone 100 is shown as having flown around the side of house 115 to the rear of house 115 in order to collect additional imagery of second damaged portion 140. Operator 105 is shown has having followed drone 100 around to the rear of house 115. Further, remote device 110 is showing a message 400 for operator 105, instructing them to "MAINTAIN LINE OF SIGHT" with drone 100.

It will be noted that the drone may not need to break line of sight in order to automatically collect additional imagery data for a noteworthy item. For example, as shown in FIG. 2, first damaged portion 135 can be further imaged with the drone still in the front of the house. That is, although the drone moves in for a closer look, the drone remains within line of sight of the operator in the front yard.

In some embodiments, the imagery is collected by drone 100 may be processed on board drone 100 in order to perform a damage assessment and valuation of the damage. In some embodiments, the imagery may be sent to, and received by, a personal electronic device and the processing may be performed on the personal electronic device. In some embodiments, the imagery may be sent to a third party processing system for such assessment and valuation.

In some embodiments, the property that the system is configured to assess is an interior of a household. In some cases, a drone may be used to collect imagery indoors. In some embodiments, a personal electronic device may be utilized to manually collect imagery of indoor property damage.

Figure 5:
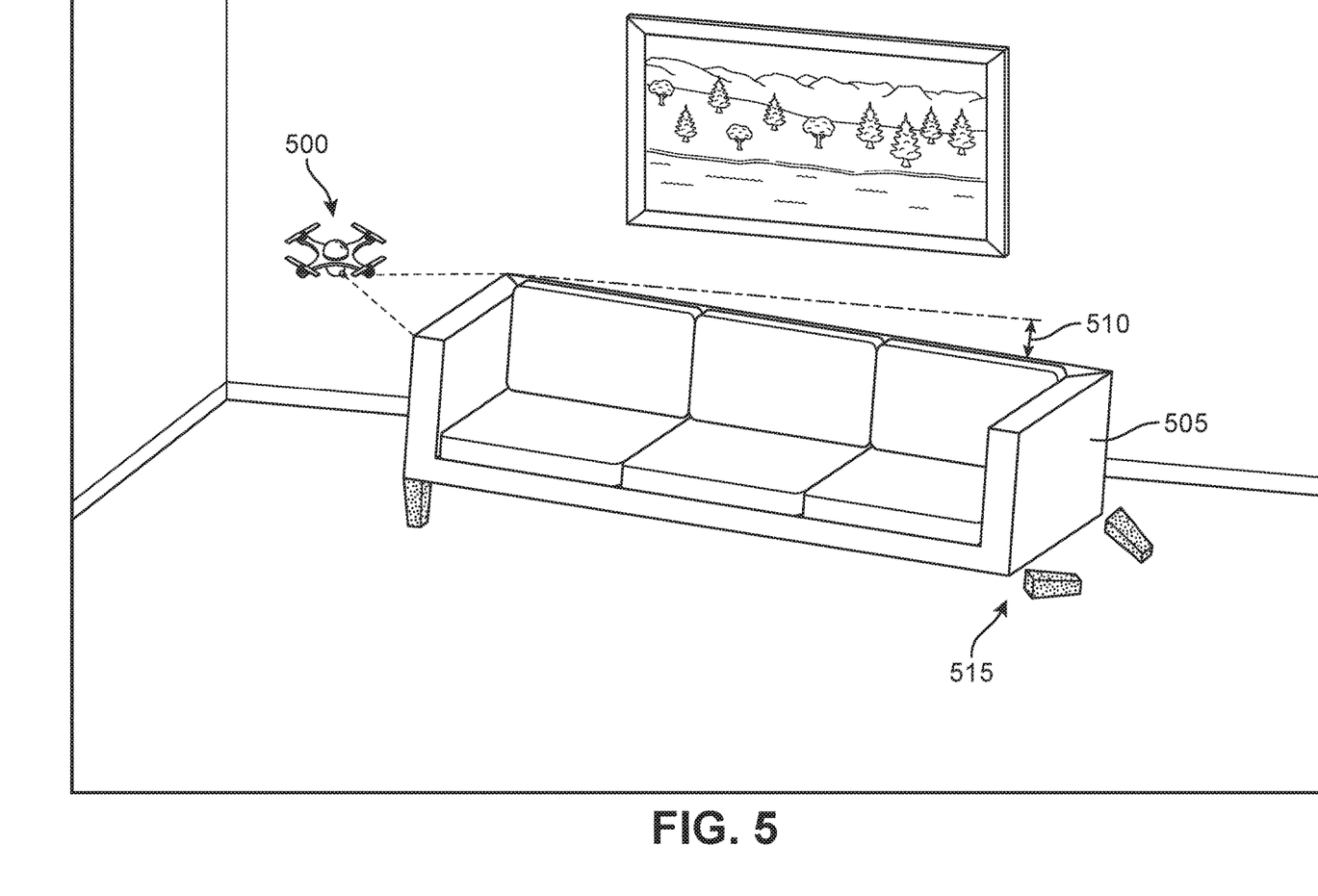
FIG. 5 is a schematic illustration of a drone collecting imagery of damage to an interior of a household.

FIG. 5 is a schematic illustration of a drone collecting imagery of damage to an interior of a household. The system shown in FIG. 5 may operate in a similar manner to that illustrated in FIGS. 1-4. For example, as shown in FIG. 5, a drone 500 may collect imagery from an interior of a household.

In some cases, anomalies may be observed in the imagery data. For example, as shown in FIG. 5, a sofa 505 may be damaged. For instance, the top edge of sofa 505 may be tilted at an angle 510 that is not normal for a fully intact sofa. In this case, the damaged portion includes broken legs 515, which are not observable by the imaging equipment of drone 500 from the perspective shown in FIG. 5. Accordingly, in order to collect more data regarding sofa 505, which the system has reason to believe may be damaged, drone 500 may fly to the other end of sofa 505 to collect additional imagery.

Figure 6:
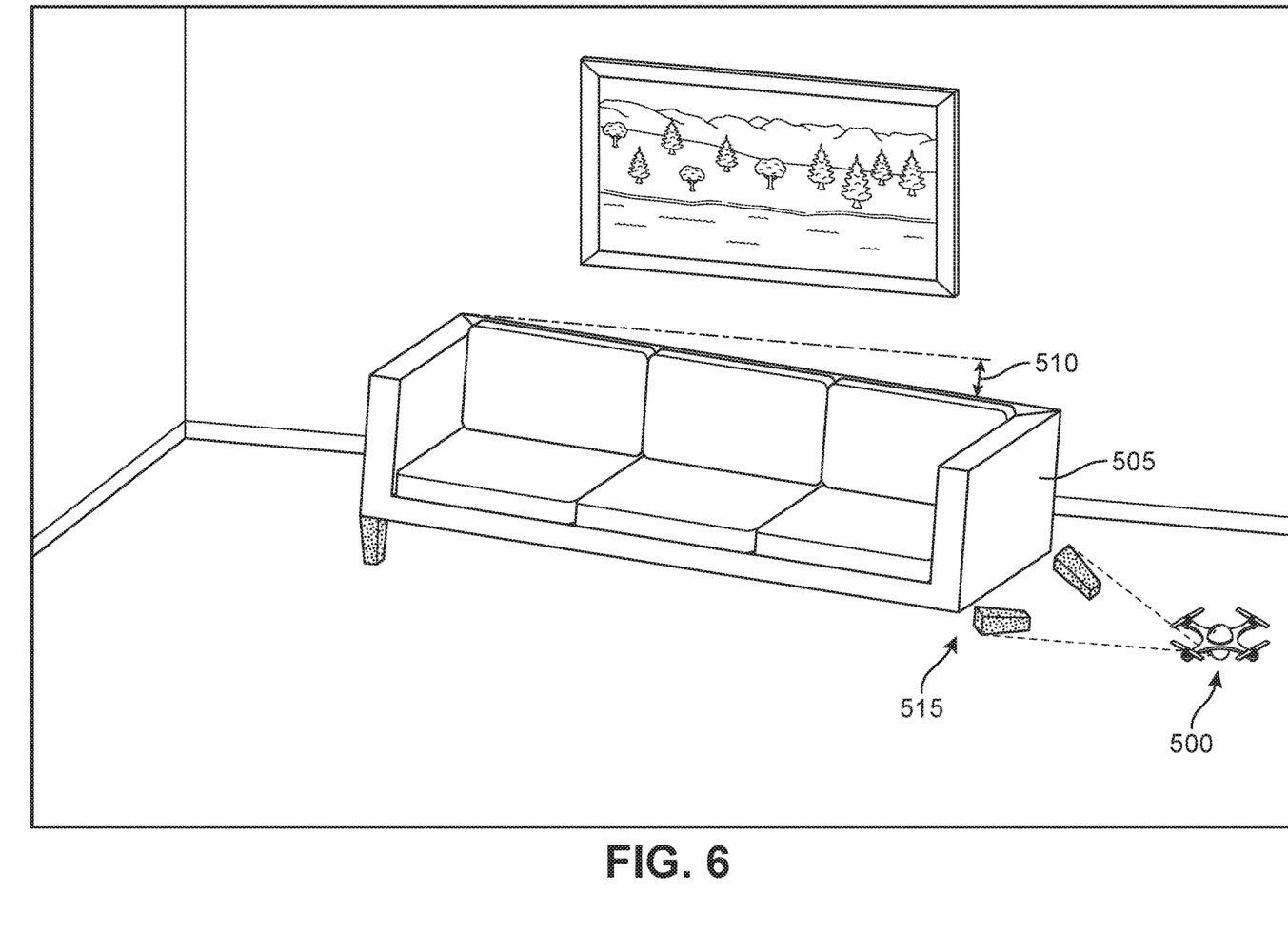
FIG. 6 is a schematic illustration of the drone of FIG. 5 collecting additional imagery of property damage in the household.

FIG. 6 is a schematic illustration of the drone of FIG. 5 collecting additional imagery of property damage in the household. As shown in FIG. 6, drone 500 has flown across the room to the opposite end of sofa 505 in order to collect additional imagery of broken legs 515.

As discussed above, the drone may not need to break line of sight in order to automatically collect additional imagery data for a noteworthy item. For example, as shown in FIG. 6, drone 500 can proceed from one side of the room to the other without breaking line of sight of the operator. In some cases, however, the drone may proceed into another room in the house. In such cases, the system may instruct the operator to move with the drone in order to maintain line of sight.

Figure 7:
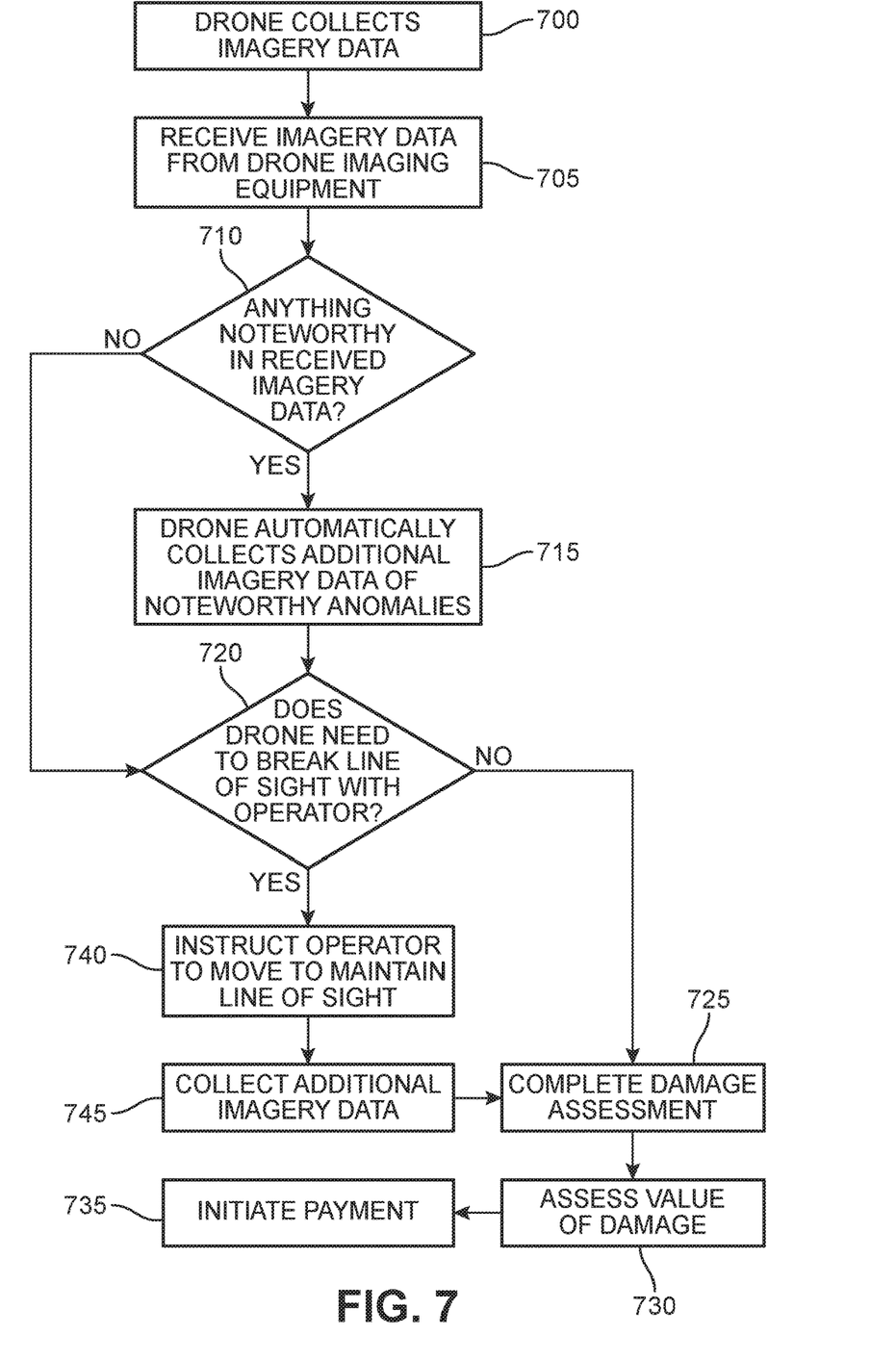
FIG. 7 is a flowchart illustrating a method of using a drone to collect imagery and assessing damage to property.

FIG. 7 is a flowchart illustrating a method of using a drone to collect imagery and assessing damage to property. As shown in FIG. 7, a method of assessing property damage may include using imaging equipment of a drone to obtain imagery data at step 700. In some cases, the method may also include using a device processor on board the drone to execute steps of the assessment that are stored in a computer readable medium also housed on board the drone. In other cases, the device processor and computer readable medium of the system may be separate from the drone. At step 705, the method may include receiving imagery data of property from the imaging equipment of the drone.

Also, the method may include determining, at step 710, whether anything noteworthy is present in the received imagery data. If so, the drone automatically collects additional imagery data of the property based on the received imagery data (step 715). If not, the system skips the collection of "additional imagery data" at step 715.

At step 720, the system inquires whether the drone needs to break line of sight with the operator due to controlled or automatic flight. If not, the method may proceed to step 725, at which a damage assessment may be performed based on the additional imagery data. In addition, once the damage assessment has been completed, the value of the damage may be assessed at step 730, where a cost value associated with repairing or replacing damaged property is assessed based on the additional imagery data. Further, once a valuation of the damage has been assessed, an insurance payment to be made to an insured party based on the damage assessment may be initiated at step 735.

If the drone does need to break line of sight with the operator, a message may be sent, at step 740, to instruct the operator to move in order to maintain line of sight with the drone. At step 745, the relocated drone may collect additional imagery data.

Following the collection of additional imagery data at step 745, the method may proceed to complete the damage assessment at 725. In addition, once the damage assessment has been completed, the value of the damage may be assessed at step 730, where a cost value associated with repairing or replacing damaged property is assessed based on the additional imagery data. Further, once a valuation of the damage has been assessed, an insurance payment to be made to an insured party based on the damage assessment may be initiated at step 735.

A benefit of the system and method disclosed herein is that the damage assessment, valuation, and payment may be made automatically without having to involve the insurance company. In some cases, the damage assessment, value assessment, and payment initiation can be completed right from the drone or from the user's personal electronic device.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision. In some cases, the damage assessment and/or valuation may be performed using computer vision/machine learning. The machine learning model may be trained by the insurance company. In addition, learnings from each assessment and/or valuation may be fed back to the machine learning model to update/retrain the model itself.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A property damage assessment system, comprising:
a drone including imaging equipment and a controller; the controller including a device processor and a non-transitory computer readable medium including instructions executable by the device processor to perform the following steps:
receiving imagery data, from a first vantage point, of property from the imaging equipment of the drone; and
making a determination, by analyzing the received imagery data, that there is damage to the property;
based on the determination that there is damage to the property, automatically controlling the drone to obtain additional imagery data of the property;
wherein automatically controlling the drone to obtain additional imagery data includes repositioning the drone by moving the drone to a second vantage point closer to the property in order to obtain an enlarged view of a portion of the property.

2. The system of claim 1, wherein the computer readable medium further includes instructions for assessing a cost value associated with repairing or replacing damaged property based on the additional imagery data.

3. The system of claim 1, wherein the computer readable medium further includes instructions for sending the imagery data to a personal electronic device; and
wherein the system further includes a computer readable medium stored on the personal electronic device and executable by a processor of the personal electronic device to assess a cost value associated with repairing or replacing damaged property based on the additional imagery data.

4. The system of claim 1, wherein the system includes a remote control device configured for controlling aspects of the drone's flight; and
wherein the computer readable medium further includes instructions for sending instructions to the remote control device to display a message for an operator of the drone.

5. The system of claim 1, wherein the drone is an aerial drone.

6. The system of claim 1, herein the property that the system is configured to assess is a rooftop.

7. The system of claim 1, wherein the property that the system is configured to assess is an interior of a household.

8. A property damage assessment system, comprising:
a drone including imaging equipment and a controller;
the controller including a device processor and a non-transitory computer readable medium including instructions executable by the device processor to perform the following steps:
receiving imagery data of a first side of property from the imaging equipment of the drone;
making a determination, by analyzing the received imagery data, that additional imagery data should be collected from a second side of the property; and
making a determination that the drone moving to the second side of the property would locate the drone out of line of sight with an operator located on the first side of the property;
based on the determination that the drone moving to the second side of the property would locate the drone out of line of sight with the operator, sending instructions to a remote device providing guidance for the operator of the drone to relocate to the second side of the property in order to maintain line of sight with the drone.

9. The system of claim 8, wherein the computer readable medium further includes instructions for performing a damage assessment based on the additional imagery data.

10. The system of claim 9, wherein the computer readable medium further includes instructions for assessing a cost value associated with repairing or replacing damaged property identified in the damage assessment.

11. The system of claim 8, wherein the property that the system is configured to assess is a rooftop.

12. A method of assessing property damage, comprising:
   using imaging equipment of a drone to obtain imagery data;
   using a device processor on board the drone to execute instructions stored on a non-transitory computer readable medium to perform the following steps:
   receiving imagery data, from a first vantage point, of property from the imaging equipment of the drone; and
   making a determination, by analyzing the received imagery data, that there is damage to the property;
   based on the determination that there is damage to the property, automatically controlling the drone to obtain additional imagery data of the property;
   wherein automatically controlling the drone to obtain additional imagery data includes repositioning the drone by moving the drone to a second vantage point closer to the property in order to obtain an enlarged view of a portion of the property.

13. The method of claim 12, further including using the device processor and the computer readable medium for assessing a cost value associated with repairing or replacing damaged property based on the additional imagery data.

14. The method of claim 12, wherein the drone is an aerial drone.

15. The method of claim 14, wherein the step of using the imaging equipment to obtain imagery data includes assessing damage to a rooftop.

16. The method of claim 14, wherein the step of using the imaging equipment to obtain imagery data includes assessing damage to an interior of a household.

\* \* \* \* \*